United States Patent
van Roermund

(10) Patent No.: US 9,742,569 B2
(45) Date of Patent: Aug. 22, 2017

(54) SYSTEM AND METHOD FOR FILTERING DIGITAL CERTIFICATES

(71) Applicant: NXP B.V., Eindhoven (NL)

(72) Inventor: Timotheus Arthur van Roermund, Eindhoven (NL)

(73) Assignee: NXP B.V., Eindhoven (NL)

( * ) Notice: Subject to any disclaimer, the term of this patent is extended or adjusted under 35 U.S.C. 154(b) by 193 days.

(21) Appl. No.: 14/269,958

(22) Filed: May 5, 2014

(65) Prior Publication Data

US 2015/0318996 A1 Nov. 5, 2015

(51) Int. Cl.
| | |
|---|---|
| *G06F 21/00* | (2013.01) |
| *H04L 9/32* | (2006.01) |
| *H04L 9/00* | (2006.01) |
| *H04L 29/06* | (2006.01) |
| *H04W 4/04* | (2009.01) |
| *H04W 12/06* | (2009.01) |

(Continued)

(52) U.S. Cl.
CPC ........... *H04L 9/3268* (2013.01); *H04L 9/006* (2013.01); *H04L 63/0823* (2013.01); *H04W 4/021* (2013.01); *H04W 4/046* (2013.01); *H04W 12/06* (2013.01); *H04W 4/06* (2013.01); *H04W 4/22* (2013.01)

(58) Field of Classification Search
CPC ... H04L 9/3268; H04L 63/0823; H04L 9/006; H04W 4/06; H04W 4/046; H04W 4/021; H04W 12/06; H04W 4/22
See application file for complete search history.

(56) References Cited

U.S. PATENT DOCUMENTS

2003/0100297 A1* 5/2003 Riordan ................... G06F 8/60
455/418
2009/0235071 A1* 9/2009 Bellur et al. .......... H04L 9/3268
713/158

(Continued)

FOREIGN PATENT DOCUMENTS

KR 2013 0139725 A 12/2013

OTHER PUBLICATIONS

Papadimitratos, Panagiotis (Panos) et al; "Certificate Revocation List Distribution in Vehicular Communication Systems"; VANET '08, San Francisco, CA USA; pp. 86-87 (Sep. 15, 2008).

(Continued)

*Primary Examiner* — Kendall Dolly

(57) ABSTRACT

One example discloses a system for filtering digital certificates within a communications network, comprising: a first set of network-nodes, having a first attribute and a respective first set of digital certificates; a second set of network-nodes, having a second attribute and a respective second set of digital certificates; and a digital certificate authority, having a digital certificate validity list which includes the first and second sets of digital certificates; wherein the certificate authority filters the validity list based on the first attribute and transmits the filtered validity list to the first set of network nodes. Another example discloses a method for filtering digital certificates, comprising: maintaining a digital certificate validity list; identifying a set of network-nodes, having an attribute; filtering the validity list based on the attribute; and transmitting the filtered validity list to the set of network-nodes.

16 Claims, 5 Drawing Sheets

(51) Int. Cl.
*H04W 4/02* (2009.01)
*H04W 4/06* (2009.01)
*H04W 4/22* (2009.01)

(56) References Cited

U.S. PATENT DOCUMENTS

| | | | |
|---|---|---|---|
| 2009/0249062 A1 | 10/2009 | Thomas et al. | |
| 2013/0067220 A1* | 3/2013 | Ando et al. | H04L 9/3268 |
| | | | 713/156 |
| 2013/0305043 A1* | 11/2013 | Zhang et al. | H04L 63/20 |
| | | | 713/158 |

OTHER PUBLICATIONS

Extended European Search Report for application 15164806.0 (dated Sep. 2, 2015).

* cited by examiner

SYSTEM AND METHOD FOR FILTERING DIGITAL CERTIFICATES

BACKGROUND

Brief Background Introduction

This specification relates generally to systems and methods for trusted communications and in one example to managing digital certificates.

SUMMARY

A system for filtering digital certificates within a communications network, comprising: a first set of network-nodes, having a first attribute and a respective first set of digital certificates; a second set of network-nodes, having a second attribute and a respective second set of digital certificates; and a digital certificate authority, having a digital certificate validity list which includes the first and second sets of digital certificates; wherein the certificate authority filters the validity list based on the first attribute and transmits the filtered validity list to the first set of network nodes.

A method, executed by a computer programmed with executable instructions, for filtering digital certificates, comprising: maintaining a digital certificate validity list; identifying a set of network-nodes, having an attribute; filtering the validity list based on the attribute; and transmitting the filtered validity list to the set of network-nodes.

The above summary is not intended to represent every example embodiment within the scope of the current or future Claim sets. Additional example embodiments are discussed within the Figures and Detailed Description below.

Figure 1:
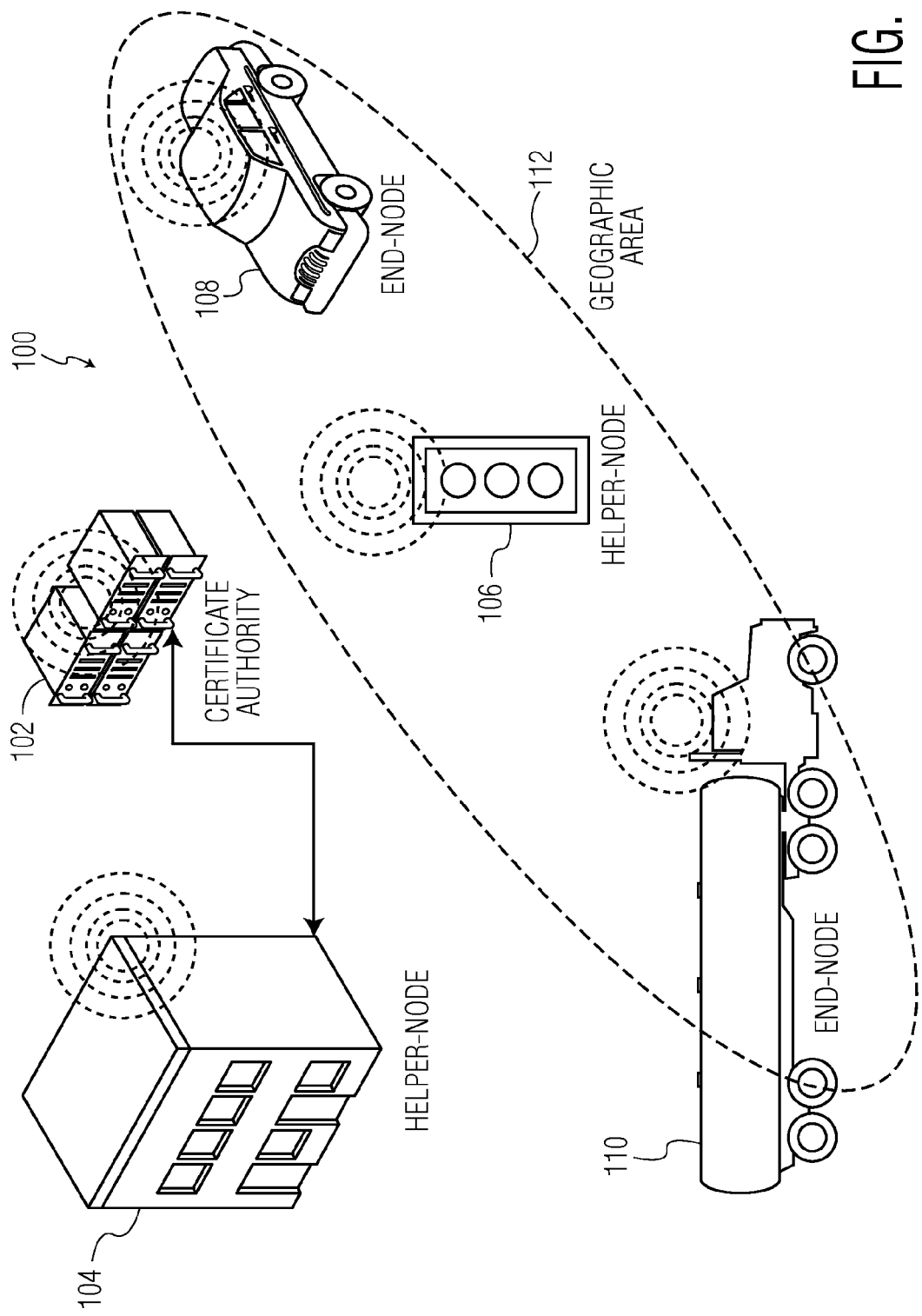
FIG. 1 is one example of a system for filtering digital certificates within a communications network.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

In the near future, new safety applications for cars will be (partially) based on ad-hoc 802.11p (car-to-car and car-to-x) communication, i.e. on messages that are exchanged between two cars, or between cars and RSUs.

Car-to-car communication uses a public key infrastructure (PKI) and digital certificates to ensure authenticity of the messages that are exchanged: the receiver of this (broadcast) application needs to be able to trust that the message was original (i.e. not modified in transfer) and that it originates from a real car.

This is implemented by adding signatures based on public-key cryptography (ECDSA P-256) to these messages, according to the IEEE 1609.2 standard (or the EU equivalent).

A digital certificate (aka. identity certificate) is an electronic file containing a certificate serial number, a public key, a user identity and a trusted signature (from a third-party) certifying that the user is associated with the public key. In public-key infrastructure (PKI) schemes, the digital certificate is signed by a trusted third-party certificate authority (CA). Thus the CA is a third-party that is trusted by both users (i.e. certificate owners) and others (i.e. second-party's) who will rely upon the certificate to establish the identity of the user. Digital certificates allow others (i.e. a second-party) to rely upon the public key sent by the user (i.e. the first-party) for authenticating the identity of the user.

Cars are given a number of digital certificates, one for each key pair (identity) that they can use to sign messages. Although the keys should be well prevented against leaking, it cannot be excluded that this happens. For example, because ITS stations (the ITS subsystem in a car, a Road-Side Unit (RSU) or any other node) will also be built into cheaper cars and RSUs. This may also have a (negative) impact on the security measures implemented in such cars and RSUs, thereby making it easier for an adversary to extract the keys from such cars.

A mechanism is thus required that allows end-nodes like cars and RSUs to be informed that specific certificates have been revoked and therefore, that entities presenting those (revoked) certificates should no longer be trusted.

In the operation of PKIs, there are two common ways to inform a network of a certificate's validity or invalidity. For nodes that are always connected to the network (internet), the node can asynchronously request the status of individual certificates using the OCSP (Online Certificate Status Protocol). With OCSP the client nodes sends a request for certificate status information to a server, which sends back a response of valid or invalid (e.g. revoked, unknown, etc.).

However, for nodes that do not always have a connection to the network (internet), a Certificate Revocation List (CRL) can be downloaded from a server by the client node when it has a connection. Such a CRL is a list of certificates (e.g. a list of certificate serial numbers for certificates) issued by a trusted third-party that are revoked depending upon an example embodiment. Parties presenting a revoked certificate is generally no longer trusted by second-parties. The list is typically centrally maintained and the address(es) for the CRL server (called "CRL distribution point location(s)") can be specified in the certificate that needs to be checked against the CRL, or alternatively it can also be manually configured in the client.

Both mechanisms may in certain embodiments have their disadvantages. One concern of using CRLs is that it requires sufficient storage in the client node for the entire CRL. However, most of the certificates in the CRL will not be relevant to the car that is downloading the CRL. So while an entry listing a single certificate may only be about 200 bytes, if 5000 certificates are revoked more than a megabyte of non-volatile memory would be required. Also, while 5000 revoked certificates may sound like a large number, it isn't actually that large compared to the total number of cars and road infrastructure. Also the entire CRL must be frequently downloaded to keep the list current at the client end.

A concern with OCSP systems is that they require that the client node be constantly connected to a network (e.g. internet), which is not possible in a mobile network. So as car-to-car communication technology is broadly implemented in the marketplace, it is highly likely that many of such cars will not have a constant connection to the internet. Even OCSP cars would require significant memory for storing large CRLs which may not be economically feasible.

Client node dependent filtering would help overcome the storage problem, since in most cases a car needs only to verify the certificate from another nearby (in proximity) car or roadside unit (RSU). The only CRL certificates that are typically relevant are the ones used by client nodes having a similar attribute, such as being close enough to directly communicate with each other.

To be discussed is a system and method for distributing filtered (e.g. partial) certificate revocation lists in systems that use a Public Key Infrastructure (PKI) to nodes that are restricted in their connectivity (e.g. broadcast systems with no internet connection to a server) and/or to nodes which do not have enough memory to store complete CRLs.

Special helper-nodes (e.g. Road-Side Unit (RSU) or law enforcement vehicles) can, in one example embodiment, be connected to the CRL servers and filter out any invalid (e.g. revoked, blacklisted, etc.) digital certificates on the CRL that were not seen (i.e. no message with that digital certificate was received) within a predetermined time period. A typical application of this concept is in the area of Intelligent Transportation Systems (ITS) where cars will be connecting to other cars and infrastructure, but (at least in the beginning) not directly to the internet.

In other example embodiments, by filtering a digital certificate revocation list based on an end-node attribute (e.g. location information), resource-restricted end-nodes would not be over burdened with unneeded information present in a complete certificate revocation list. For example a complete set of valid and invalid certificates can be filtered based on a proximity history of client nodes that were observed in a certain area over a certain time period with reference to a location of a particular end-node which is to receive the filtered list.

While car-to-car communications will be primarily discussed below, the teaching herein can be applied to any other system that uses PKI with certificate invalidity or revocation where the client nodes (e.g. end-nodes) are resource limited in some way (e.g. restricted in internet connectivity or memory) and where a set of end-node attributes (e.g. positions of a set of end-nodes) are known.

FIG. 1 is one example of a system 100 for filtering digital certificates within a communications network. The communications network in one example is a wireless vehicle-to-vehicle network communications network.

The system 100 in one example includes a first set of network-nodes, having a first attribute and a respective first set of digital certificates. The first set of network-nodes include helper-node 106, end-node 108 and end-node 110 which together are referred to as a set of communications network-nodes. The first attribute is that each of these nodes are located within a geographic area 112.

The system 100 also includes a second set of network-nodes, having a second attribute and a respective second set of digital certificates. The second set of network-nodes include helper-node 104 and other end-nodes (not shown). Since the second set of network-nodes are not within the geographic area 112 their second attribute (e.g. geographic area) is different.

A digital certificate authority 102 maintains a digital certificate validity list which includes the first and second sets of digital certificates. The certificate authority 102 filters the validity list based on the first attribute and transmits the filtered validity list to those network-nodes having this first attribute (i.e. to the first set of network nodes in the example discussed above).

A filtered certificate validity list (e.g. a localized validity list) is herein defined to include digital certificates from network-nodes that have been filtered by one or more network-node attributes. These attributes can include a network-node's geographic location (e.g. exact position or general area), distance from a geographic location or activity time period.

These attributes can also include the network-node's privileges or function in the communications network, hardware or software within the network-node, memory or processing capability of the node, and/or a set of users associated with the network-node.

A certificate may contain additional attribute (meta) information, such as a list of privileges granted to the node-owner of the certificate. In an ITS use case, the certificate could state that the vehicle is allowed to make certain claims in the messages it broadcasts, signed with the key pair associated to the certificate. One example claim could be that the vehicle-node identified by the certificate has an activated light-bar/siren, because the vehicle-node is a priority vehicle (e.g. police car, ambulance, military, tow-truck, civil service, etc.) that is on its way to an incident. Another example claim could be posting of new infrastructure setting (e.g. temporary, weather dependent, or accident dependent speed limits) authorized by a privileged node.

The attributes can also define a type of network-node such as: an end-node, a helper-node, a roadside unit (RSU) node, a vehicle-node, an emergency vehicle-node or a law enforcement vehicle-node.

End-nodes in some examples can be network-nodes having a lowest level of trust within the network (e.g. having a greater likelihood that their digital certificates will be invalidated) or with a lower level of processing capability or memory for storage.

Helper-nodes in some examples can be network-nodes having a higher level of trust within the network (e.g. having a lesser likelihood that their digital certificates will be invalidated) or with a higher level of processing capability or memory for storage. Helper-nodes can include traffic lights, roadside units, emergency or law enforcement vehicles, and fixed buildings (e.g. helper-node 104). The helper-nodes in certain example embodiments are strategically chosen such that together they cover the complete geographic area 112.

During operation, helper-nodes such as 106 monitor network communications within their proximity (e.g. geographic area 112) and keeps a record of a time (e.g. timestamps) and location at which a digital certificate from any of the other network-nodes (e.g. end-nodes) has been used.

Helper-nodes also track when a network-node's attributes change, such as when a new vehicle (e.g. end-node 108) enters the geographic area 112. Thus during operation of the system 100 a first set of network-nodes can have a first attribute at a first time and a second attribute at a second time. The helper-node 106 then transmits these recorded updates to the certificate authority 102.

The digital certificate validity list maintained and filtered by the certificate authority 102, as discussed above, identifies which digital certificates are valid and which are invalid. One example of how invalid digital certificates can be categorized is by adding the invalid digital certificate to a certificate revocation list (CRL).

In some example embodiments of the system 100 the certificate authority 102 only transmits the certificate revocation list to the helper-nodes and end-nodes, thereby further reducing network traffic and processing and memory resource requirements at the end-nodes and helper-nodes. To further save network and node resources the certificate authority 102 may only transmit the digital certificate serial numbers to the helper-nodes and end-nodes.

The certificate authority 102, in various example embodiments, transmits the filtered validity list to the network-nodes either in response to a helper-node or end-node request, when the validity list has changed significantly since a last time the filtered validity list was transmitted to the network-nodes, or after a predetermined time period has elapsed since a last time the filtered validity list was transmitted to the network-nodes.

Depending upon how the communications network is structured, the certificate authority 102 may work with a set of filtering-servers (see reference 302 below) responsible for communicating with helper-nodes and end-nodes having a particular attribute (e.g. all located within a specific geographic area 112).

Figure 2:
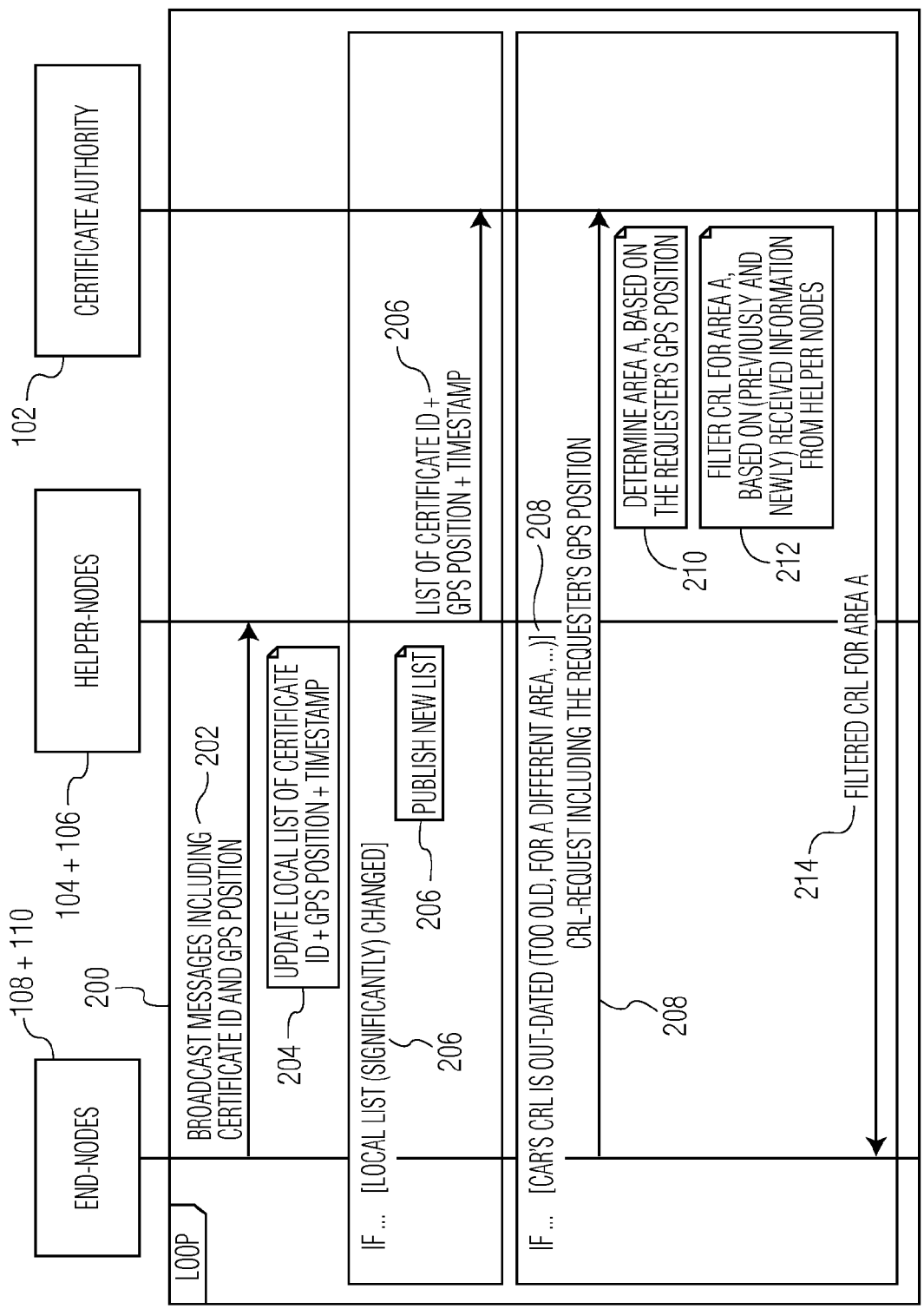
FIG. 2 is an example of dataflow diagram for implementing the system.

FIG. 2 is an example of dataflow diagram 200 for implementing the system. The end-nodes 108 & 110 broadcast messages 202 including their digital certificate ID and their GPS position to the helper-nodes 104 & 106. The end-nodes (e.g. client-nodes) are connected to the helper-nodes via ad-hoc networks in which messages are broadcasted. The helper-nodes 104 & 106 update and maintain 204 a local list of digital certificate IDs, a last GPS position of the end-nodes and time-stamp when the broadcast message from the end-node was received. The helper-nodes are connected to the certificate authority 102 via a network (e.g. IP, cellular, etc.).

The helper-nodes (e.g. traffic lights) are strategically chosen such that they together cover the complete geographic area 112 (e.g. area-A). The helper-nodes 104 & 106 are also programmed to publish 206 their local lists to the certificate authority 102 at either a predetermined time or in response to detecting a predetermined number of changes to its locally maintained digital certificate list. Such publications from the helper-nodes keep the certificate authority 102 informed as to which digital certificates have been detected in which geographic areas.

In this example embodiment, the end-nodes are programmed to request 208 an updated certificate revocation list directly from the certificate authority 102. So that the end-node's request reaches the certificate authority 102, the end-node is configured (statically or on the fly) with a list of addresses of helper-nodes that can relay the end-node's request to the certificate authority 102. The end-node may send this request either at a predetermined time or in response a change in one of the end-node's attributes (e.g. when the end-node move from one geographic area to another).

In response to the end-node's request 208, the certificate authority 102 identifies the requesting end-node's attributes 210 (e.g. determines that the end-node is in area-A based on the requesting end-node's GPS position). The certificate authority 102 then filters 212 the digital certificate validity list based on the end-node's defining attribute (e.g. geographical area). Note that the digital certificate validity list may consist of the certificates issued by multiple certificate authorities, reducing the need for the end-node to retrieve multiple certificate revocation lists from different certificate authorities. The filtered certificate revocation list is then signed by the certificate authority.

The filtered certificate revocation lists are then transmitted 214 to (e.g. downloaded by and/or broadcasted to) the requesting end-node's (e.g. cars). If broadcasted, then other end-nodes will also receive the certificate revocation list even though such other end-nodes did not request the certificate revocation list. Thus the broadcast transmission is particularly useful for quickly informing all end-nodes in a certain geographic area (or having a certain common attribute) when a new revoked (e.g. blacklisted) certificate was recently spotted in that area. Filtering and distribution of the filtered list to the end-nodes shall happen regularly enough, to prevent a client node that uses a blacklisted certificate from moving quickly to another area from remaining undetected for too long.

Figure 3:
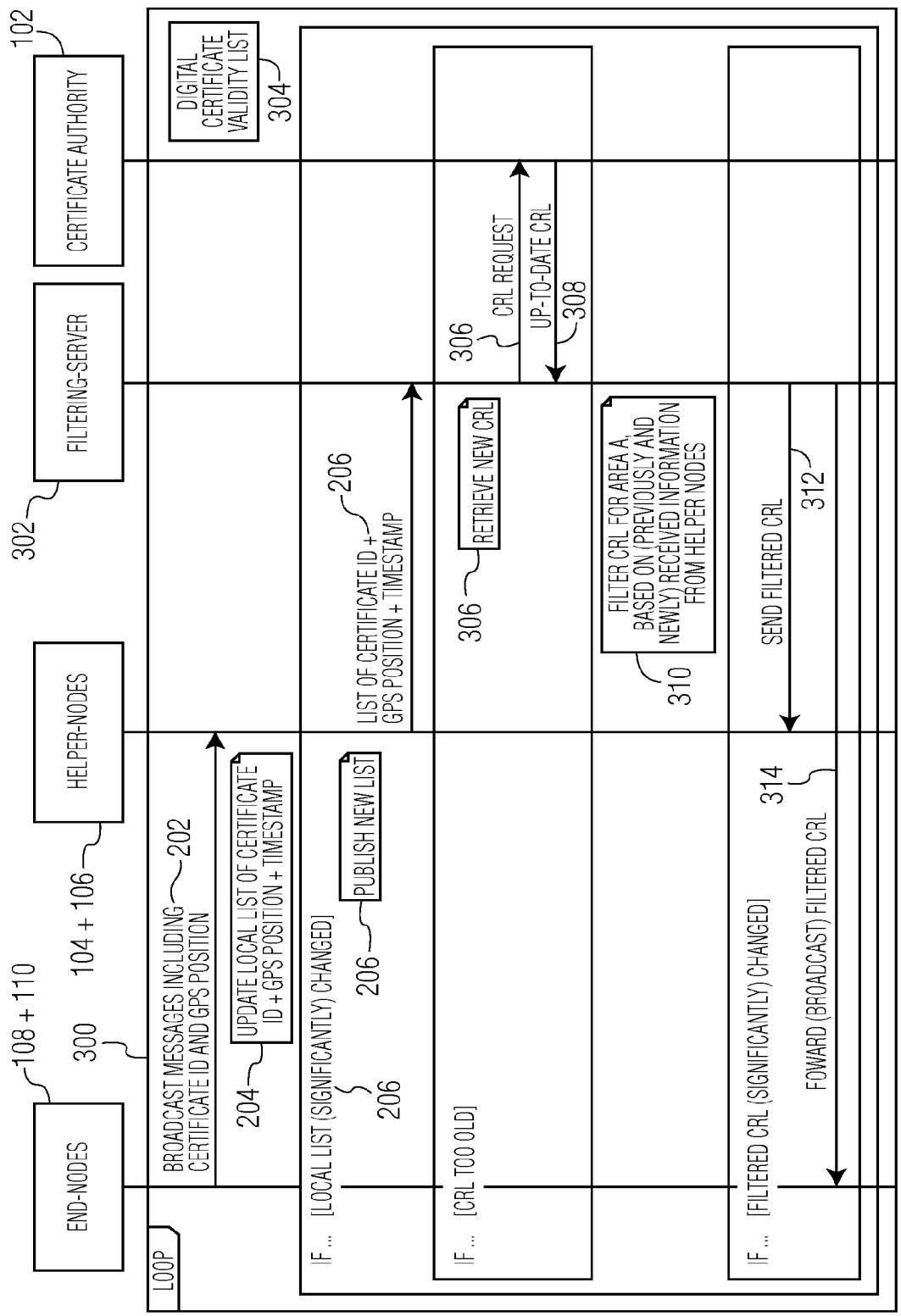
FIG. 3 is another example of dataflow diagram for implementing the system.

FIG. 3 is a second example of dataflow diagram 300 for implementing the system. This second example dataflow diagram 300 differs from the first example dataflow diagram 200 mainly by the addition of a filtering server 302 between the helper-nodes 104 & 106 and the certificate authority 102.

The filtering server 302 in this example 300 is dedicated to a particular attribute or set of attributes of the end-nodes and helper-nodes (e.g. perhaps dedicated to a particular geographic area 112). The filtering server 302 can thus be a type of local server that is creating only a subset of the digital certificate validity lists 304 applicable to the specific geographic area it serves. In another example, the filtering server 302 can be a more centralized server that performs filtering for multiple areas.

Either some trust relation must exist between the filtering server 302 and the certificate authority 102, or the filtering server's 302 digital certificate needs to include a permission to create filtered certificate validity lists 304 for the certificate authorities, such that end-nodes can trust the authenticity of the certificate validity lists 304 created by the filtering server 302.

In this example dataflow 300, the helper-nodes publish 206 their local lists to the filtering server 302 instead of direct to the certificate authority 102 and in example dataflow 200. The filtering server 302 then determines if the certificate validity list 304 (e.g. certificate revocation list) is too old and if so requests 306 an updated CRL from the certificate authority 102. In this example dataflow 300 however, the certificate authority 102 does not filter the CRL but instead transmits 308 an unfiltered version of the CRL to the filtering server 302.

The filtering server 302 then identifies the requesting end-node's attributes 210 and filters 310 the digital certificate validity list based on the end-node's defining attribute (e.g. geographical area). The filtered certificate revocation list is then transmitted 312 to the appropriate helper-nodes 104 & 106. The helper-nodes then broadcast 314 the filtered CRL to the end-node's (e.g. to the cars in the geographic area-A).

Figure 4:
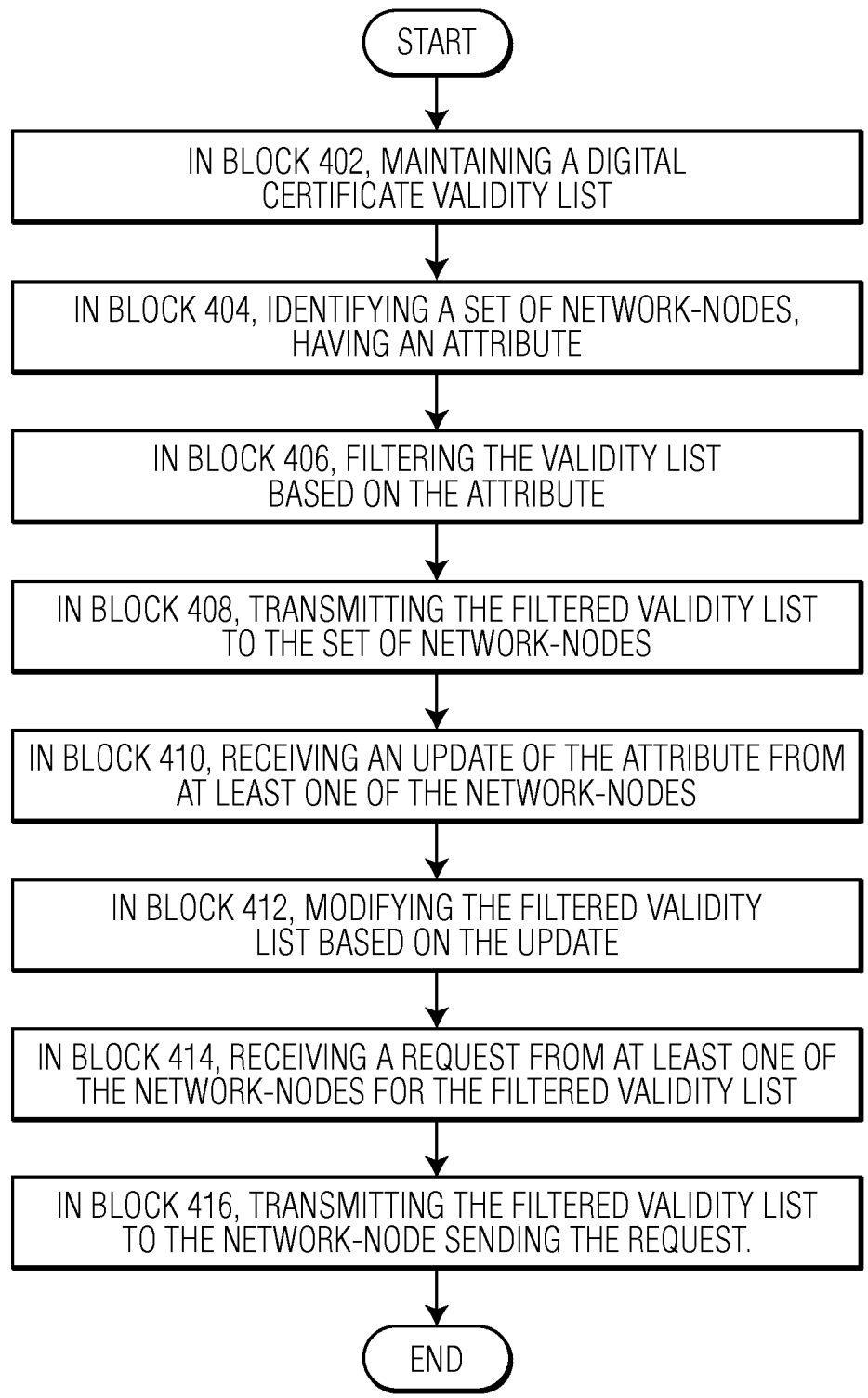
FIG. 4 is one example of a flowchart for implementing a method for filtering digital certificates.

FIG. 4 is one example of a flowchart for implementing a method for filtering digital certificates. The method is now discussed as a set of blocks which are presented in one example order of execution. In alternate example embodiments, these blocks can be executed in various other orders. The method begins in block 402, by maintaining a digital certificate validity list. Next in block 404 a set of network-nodes, having an attribute is identified. Then in block 406 the validity list is filtered based on the attribute. The filtered validity list is transmitted to the set of network-nodes in block 408.

The method can be augmented with the following additional sets of blocks.

In block 410, of a first set of blocks, an update of the attribute is received from at least one of the network-nodes. Then in block 412, the filtered validity list is modified based on the update.

In block 414, of a second set of blocks, a request is received from at least one of the network-nodes for the filtered validity list. Then in block 416, transmitting the filtered validity list to the network-node sending the request.

Figure 5:
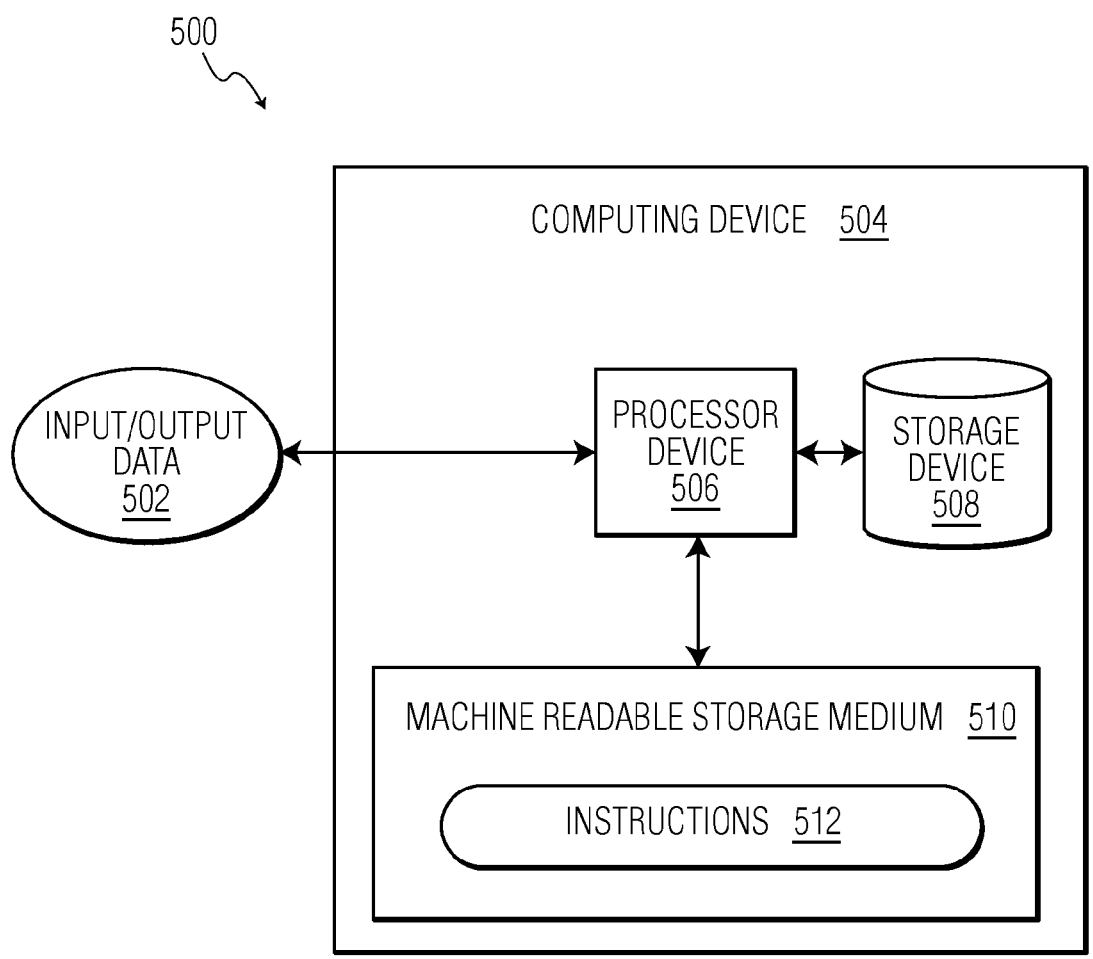
FIG. 5 is another example of a system for filtering digital certificates.

FIG. 5 is another example 500 of a system for filtering digital certificates. The diagram 500 shows an input/output data 502 interface with a computing device 504. The computing device 504 includes a processor device 506, a storage device 508, and a machine-readable storage medium 510. Instructions 512 within the machine-readable storage medium 510 control how the processor 506 interprets and transforms the input data 502, using data within the storage device 508. In one example, the instructions 512 stored in the machine-readable storage medium 510 include those shown in FIG. 4.

The processor (such as a central processing unit, CPU, microprocessor, application-specific integrated circuit (ASIC), etc.) controls the overall operation of the storage device (such as random access memory (RAM) for temporary data storage, read only memory (ROM) for permanent data storage, firmware, flash memory, external and internal hard-disk drives, and the like). The processor device communicates with the storage device and machine-readable storage medium using a bus and performs operations and tasks that implement one or more blocks stored in the machine-readable storage medium.

The blocks comprising the flowcharts in the above Figures can be executed in any order, unless a specific order is explicitly stated. Also, those skilled in the art will recognize that while one example method embodiment is now discussed, the material in this specification can be combined in a variety of ways to yield other examples as well. The method next discussed is to be understood within a context provided by this and other portions of this detailed description.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

The term file or a set of files refers to any collection of files, such as a directory of files. A file can refer to any data object (e.g., a document, a bitmap, an image, an audio clip, a video clip, software source code, software executable code, etc.). A file can also refer to a directory (a structure that contains other files).

In one example, one or more blocks or steps discussed herein are automated. In other words, apparatus, systems, and methods occur automatically. The terms automated or automatically (and like variations thereof) mean controlled operation of an apparatus, system, and/or process using computers and/or mechanical/electrical devices without the necessity of human intervention, observation, effort and/or decision.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. A communications network-node circuit, comprising:
   a storage device;
   a receiver configured to receive a local digital certificate list published by a helper-node statically positioned within a geographic area, wherein the helper-node maintains the local digital certificate list based on end-nodes entering the geographic area and publishes the local digital certificate list in response to detecting a predetermined number of changes to the local digital certificate list based on the end-nodes entering the geographic area;
   a digital certificate validity list circuit configured to download and, subsequently, to store in the storage device,
      a first set of digital certificates corresponding to a first set of network-node devices, having a first set of geographic and device performance attributes, wherein the first set of digital certificates are based on the local digital certificate list;
      a second set of digital certificates corresponding to a second set of network-node devices, having a second set of geographic and performance attributes; and
      a digital certificate validity list including the first set of digital certificates and the second set of digital certificates; and
   wherein the communications network-node circuit includes circuits configured to,
   filter the digital certificate validity list based on a range of geographic and device performance attributes; and
   transmit the filtered digital certificate validity list to the first set of network-node devices if the first set of geographic and device performance attributes are within the range, wherein the first set of network-node devices download and store in memory the filtered digital certificate validity list and use the filtered digital certificate validity list to verify digital certificate invalidity; and
   transmit the digital certificate validity list to the second set of network-node devices if the second set of geographic and device performance attributes are within the range, wherein the second set of network-node devices download and store in memory the digital certificate validity list, and wherein the first set of network-node devices and the second set of network-node devices are end-node devices.

2. The communications network-node circuit of claim 1: wherein the range of attributes define a predefined distance from a geographic location.

3. The communications network-node circuit of claim 1: wherein the range of attributes define a time period.

4. The communications network-node circuit of claim 1: wherein the digital certificate validity list includes a certificate revocation list.

5. The communications network-node circuit of claim 1, further comprising:
   a certificate authority circuit configured to filter the digital certificate validity list based on a digital certificate change of status between valid and invalid.

6. The communications network-node circuit of claim 1: wherein a subset of the first set of network-node devices have the first attribute at a first time and the second attribute at a second time; and further comprising a certificate authority circuit configured to filter the digital certificate validity list based on the first attribute at the first time and filters the digital certificate validity list based on the second attribute at the second time.

7. The communications network-node circuit of claim 1:
wherein the second set of network-node devices have a second attribute at a first time and the first attribute at a second time; and
further comprising a certificate authority circuit configured to transmit an updated digital certificate validity list based on the first attribute to the first set of network-node devices at the second time.

8. The communications network-node circuit of claim 1, further comprising:
a certificate authority circuit configured to transmit the filtered digital certificate validity list to the first set of network-node devices after a predetermined time period has elapsed since a last time the filtered digital certificate validity list was transmitted to the first set of network-node devices.

9. The communications network-node circuit of claim 1, further comprising:
a certificate authority circuit configured to transmit the filtered digital certificate validity list to the first set of network-node devices after a predetermined number of digital certificate changes have been made to the filtered digital certificate validity list since a last time the filtered digital certificate validity list was transmitted to the first set of network-node devices.

10. The communications network-node circuit of claim 1:
wherein the communications network is a wireless communications network.

11. The communications network-node circuit of claim 1:
wherein the filtered digital certificate validity list includes a certificate serial number for each of the network-node devices having the first attribute.

12. The communications network-node circuit of claim 1:
wherein the device performance attributes of the network-node devices include a network-node device hardware attribute.

13. The communications network-node circuit of claim 1:
where in the device performance attributes of the network-node devices include a network-node device software attribute.

14. The communications network-node circuit of claim 1:
wherein the device performance attributes of the network-node devices include a network-node device memory capacity attribute.

15. The communications network-node circuit of claim 1:
wherein the device performance attributes of the network-node devices include a network-node device processing capacity attribute.

16. The communications network-node circuit of claim 1:
wherein the device performance attributes of the network-node devices include a network-node device user privilege attribute.

\* \* \* \* \*